(12) United States Patent
Monks et al.

(10) Patent No.: US 8,130,110 B2
(45) Date of Patent: Mar. 6, 2012

(54) REPORTING A FAULTY CHARGING DEVICE

(75) Inventors: Morgan H. Monks, Tempe, AZ (US);
David E. Haglan, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 343 days.

(21) Appl. No.: 12/360,245

(22) Filed: Jan. 27, 2009

(65) Prior Publication Data
US 2010/0188237 A1    Jul. 29, 2010

(51) Int. Cl.
*G08B 21/00*    (2006.01)
(52) U.S. Cl. ........................................ 340/662; 340/635

(58) Field of Classification Search .................... 340/662
See application file for complete search history.

(56) References Cited

U.S. PATENT DOCUMENTS 6,046,575 A * 4/2000 Demuro ........................ 320/134
(Continued)

*Primary Examiner* — Travis Hunnings
(74) *Attorney, Agent, or Firm* — Meyertons, Hood, Kivlin, Kowert & Goetzel, P.C.; Jeffrey C. Hood; Joel L. Stevens

(57) ABSTRACT

Reporting a faulty charging device. A mobile device may determine if a charging device is a faulty charging device. The determination may be performed after coupling the charging device to a power source and to the mobile device. If the charging device is a faulty charging device, the mobile device may report a location of the faulty charging device over a network.

23 Claims, 3 Drawing Sheets

U.S. PATENT DOCUMENTS

| | | | |
|---|---|---|---|
| 6,184,652 B1 | 2/2001 | Yang | |
| 6,304,060 B1 * | 10/2001 | Dernehl | 320/132 |
| 6,477,363 B1 * | 11/2002 | Ayoub et al. | 455/404.2 |
| 6,753,671 B1 * | 6/2004 | Harvey | 320/107 |
| 6,798,173 B2 | 9/2004 | Hsu | |
| 7,151,950 B1 | 12/2006 | Oyang et al. | |
| 7,305,243 B1 * | 12/2007 | Tendler | 455/456.2 |
| 7,358,703 B2 | 4/2008 | Veselic | |
| 7,501,792 B2 | 3/2009 | Borjeson et al. | |
| 2004/0021440 A1 * | 2/2004 | Pannwitz | 320/100 |
| 2005/0131495 A1 * | 6/2005 | Parramon et al. | 607/61 |
| 2006/0022637 A1 * | 2/2006 | Wang et al. | 320/112 |
| 2008/0042616 A1 | 2/2008 | Monks et al. | |
| 2008/0126594 A1 | 5/2008 | Monks et al. | |
| 2008/0207277 A1 * | 8/2008 | Sunda | 455/573 |

* cited by examiner

REPORTING A FAULTY CHARGING DEVICE

FIELD OF THE INVENTION

The present invention relates to the field of mobile devices, and more particularly to a system and method for reporting a faulty charging device attached to a mobile device.

DESCRIPTION OF THE RELATED ART

In recent years, the field of mobile devices (e.g., cellular phones) has increased dramatically. Increasingly, mobile devices may be charged using a Universal Serial Bus (USB) interface. For example, these mobile devices may be charged by coupling a USB cable to the mobile device and also coupling the USB cable to a power source (e.g., a wall socket or computer system). However, some USB chargers improperly provide power to charge mobile devices, which can result in damage to the mobile device coupled to the USB charger. Accordingly, improvements in mobile devices and/or chargers are desired.

SUMMARY OF THE INVENTION

Various embodiments are presented of a system and method for reporting a faulty charging device.

A mobile device may determine if a charging device is a faulty charging device. Determining if the charging device is faulty may include determining if the charging device is providing an over voltage (e.g., a voltage over 5.5 volts). Accordingly, the overvoltage may be dissipated (e.g., by a high voltage tolerant device). The determination may be performed after coupling the charging device to a power source and to the mobile device.

If the charging device is a faulty charging device, the mobile device may report a location of the faulty charging device over a network. Reporting the location of the faulty charging device may include determining global positioning system (GPS) location information and reporting the GPS location information over the network. Additionally, or alternatively, reporting the location of the faulty charging device may include determining location information using one or more wide area network towers (e.g., cell phone towers). Similarly, reporting the location of the faulty charging device may include determining location information based on available local wireless networks (e.g., WiFi networks).

A visual and/or audible indication of the faulty charging device may be provided to a user of the mobile device (e.g., on a display of the mobile device and/or via an audio output of the mobile device). The mobile device may store the information about the faulty device into memory to be read later if the phone is returned for service. The stored information can include the time, location, and other information gathered when the faulty charger was attached.

The mobile device (capable of performing the method above), may include a processor, a network port coupled to the processor, a charging device port for coupling to a charging device, a battery coupled to the charging device port for receiving power from the charging device, first circuitry, second circuitry, and a memory coupled to the processor.

The first circuitry may be coupled to the charging device port and may be configured to determine if the charging device is a faulty charging device. The first circuitry may be configured to operate after the charging device port is coupled the charging device. The first circuitry may be configured to determine if the charging device is providing an overvoltage (e.g., a voltage over 5.5 volts) to determine if the charging device is a faulty charging device. In some embodiments, the first circuitry may include high voltage tolerant circuitry. The high voltage tolerant circuitry may be coupled to the charging device port and the battery and may be configured to dissipate the overvoltage.

The second circuitry coupled to the processor may be configured to determine a location of the mobile device. The second circuitry may include global positioning system (GPS) circuitry for determining the location of the mobile device. Alternatively, or additionally, the second circuitry may be configured to use one or more wide area network towers to determine the location of the mobile device. The second circuitry may be configured to determine the location of the mobile device based on available local wireless networks.

The memory may store program instructions executable by the processor to report the location of the faulty charging device over a network using the second circuitry and the network port. The location of the faulty charging device may be provided to a service provider of the mobile device, a network administrator of the mobile device, or a user of the mobile device, as desired.

Additionally, an indication of the faulty charging device may be provided via a display of the mobile device (e.g., in the case of a visual indication) and/or an audio output of the mobile device (e.g., in the case of an audio indication).

Various embodiments described above may be implemented as a memory medium (e.g., of the mobile device) comprising program instructions. The program instructions may be executable to implement the method described above.

A system for receiving the location of the mobile device may include one or more processors and one or more memory mediums coupled to the one or more processors. The one or more memory mediums may store program instructions executable by the one or more processors to receive an indication that a faulty charging device is coupled to a mobile device from the mobile device over a network. The program instructions may be executable to receive a location of the faulty charging device and provide the location of the faulty charging device to an administrator of the faulty charging device.

BRIEF DESCRIPTION OF THE DRAWINGS

A better understanding of the present invention can be obtained when the following detailed description of the preferred embodiment is considered in conjunction with the following drawings, in which.

Figure 1A:
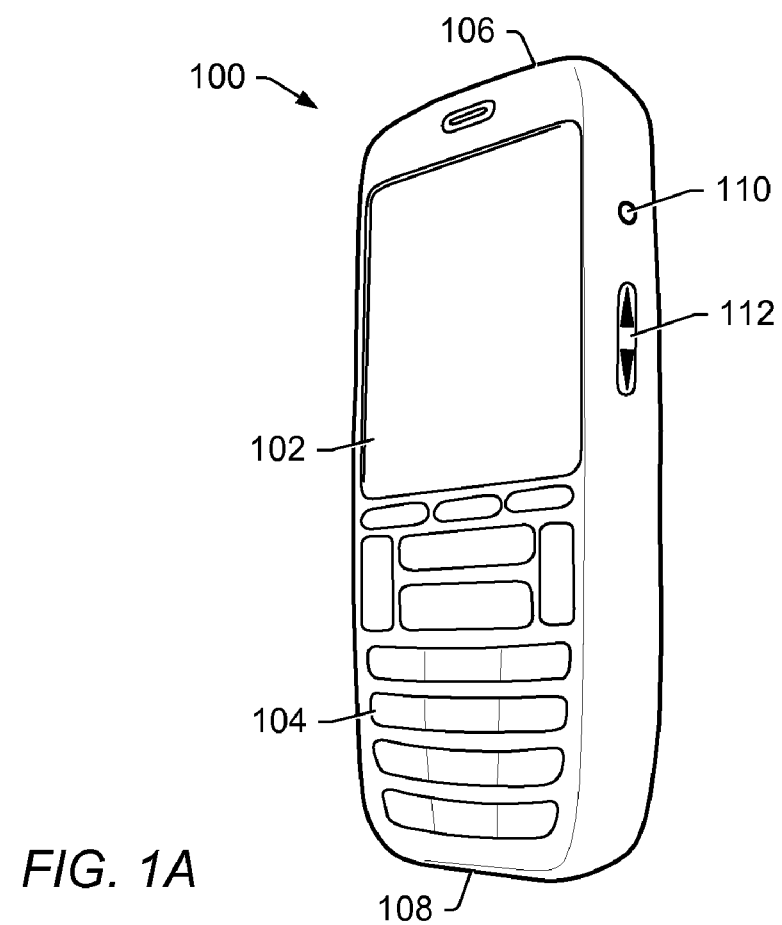
FIG. 1A illustrates an exemplary mobile device according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, flash memory, etc. The memory medium may comprise other types of memory as well, or combinations thereof. In addition, the memory medium may be located in a first device in which the programs are executed, or may be located in a second different device which connects to the first device over a network, such as the Internet. In the latter instance, the second device may provide program instructions or data to the first device for execution or reference. The term "memory medium" may include two or more memory mediums which may reside in different locations, e.g., in different computers that are connected over a network.

Software Program—the term "program" or "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device—any of various types of computer systems which are mobile or portable, including laptops, PDAs, mobile or mobile telephones (e.g., including satellite phones), handheld devices, portable Internet devices, music players, data storage devices, etc. In general, the term "mobile device" can be broadly defined to encompass any electronic, computing, and/or telecommunications device (or combination of devices) which is easily transported by a user. However, in some embodiments, the mobile device may necessarily require communication ability, e.g., wireless communication ability.

Figure 1B:
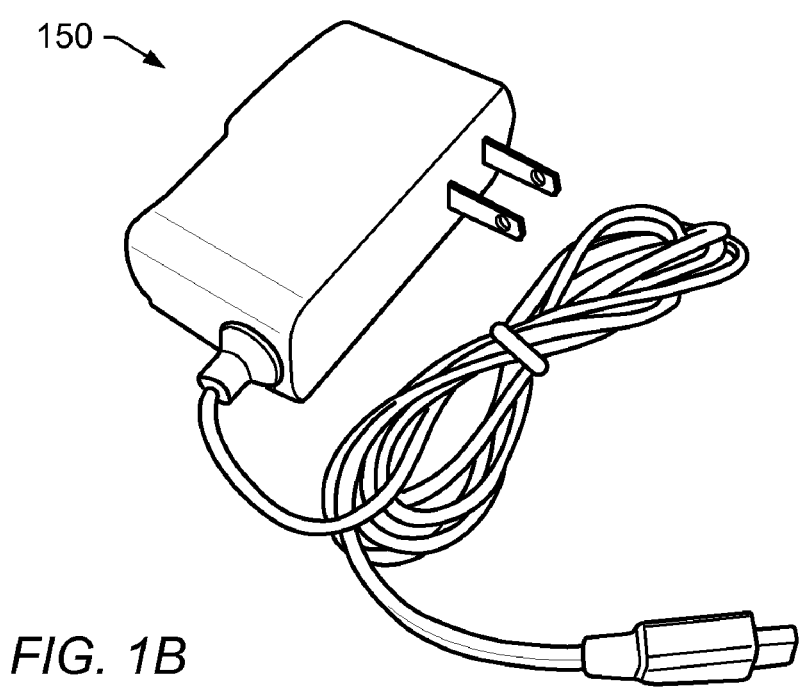
FIG. 1B illustrates an exemplary mobile device coupled to an exemplary charging device according to an embodiment of the present invention.

FIG. 1A and 1B—Exemplary Mobile Device and Charging Device

FIGS. 1A and 1B illustrate an exemplary mobile device 100 and a charging device 150. As shown, the mobile device 100 includes a display 102, interface buttons 104, power button 106, docking/charging port 108, audio port 110, and volume controls 112. Note that these elements are exemplary only and that any of these features may be removed or substituted with others as desired. Note further that the shape and type of the mobile device 100 is exemplary only. For example, while the current exemplary mobile device 100 resembles a PDA or mobile telephone (e.g., possibly a satellite phone), the mobile device 100 may be a portable computer or laptop, among other types of form factors/portable devices. Furthermore, in some embodiments, the interface buttons 104 may be removed or replaced with a single interface button. Additionally, or alternatively, the display may be a touch or multi-touch display which may receive input via the user touching the display, e.g., with fingers, stylus, etc. Furthermore, the mobile device 100 may include one or more ports for peripherals, e.g., keyboards, mice, microphones, etc.

FIG. 1B illustrates an exemplary charging device 150 usable in conjunction with the mobile device 100. More specifically, the charging device 150 may be used to charge a battery or other power storage device of the mobile device 100. For example, in one embodiment, the charging device 150 may couple to a power outlet, e.g., a wall outlet, to provide power from the power outlet to the mobile device 100, e.g., to charge the battery of the mobile device 100. Thus, in some embodiments, the charging device 150 may convert AC power to DC power using an AC/DC converter. In some embodiments, the charging device 150 may be a car charging device which couples to a power outlet of a car (e.g., a cigarette lighter or other power outlet of the car). Alternatively, the charging device could be a computer system which is coupled to the mobile device 100, and provides power to the mobile device 100. When connected to the computer system, various functions may be performed, e.g., synching of the mobile device 100 with the computer system, firmware updates, provision of audio or video signals, etc. In some embodiments, the charging device 150 may couple to the mobile device 100 via port 108, which may be a universal serial bus (USB) port.

In some embodiments, the charging device 150 may include one or more interface buttons for operating the charging device 150. For example, the charging device 150 may have buttons for turning on or off the charging device 150 and/or other buttons for specifying operational parameters of the charging device 150, such as voltage of the provided power. Thus, the charging device 150 may couple to the mobile device 100 and a power source to provide power to the mobile device 100, e.g., to charge a battery of the mobile device 100 and/or to operate the mobile device 100.

Figure 2:
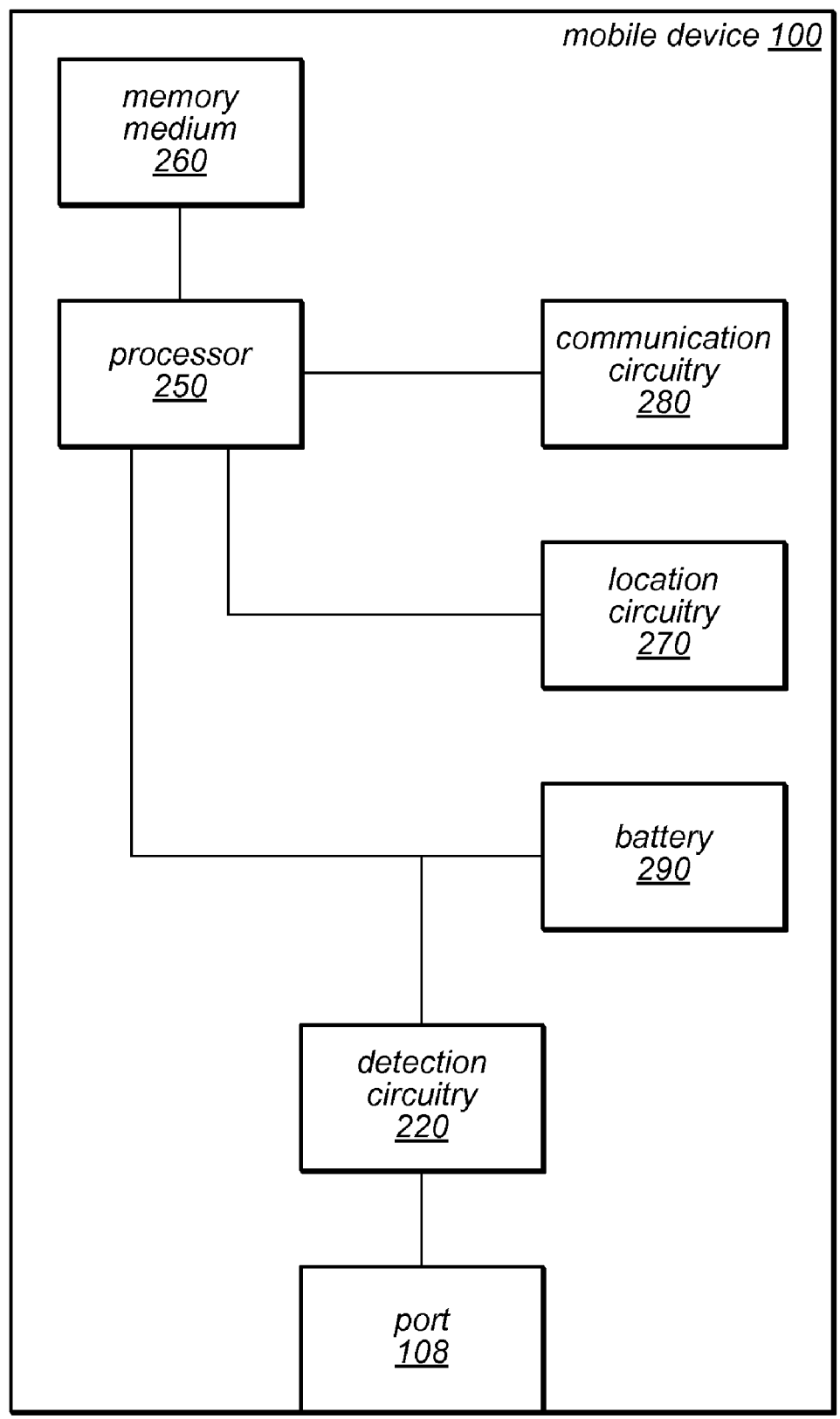
FIG. 2 is a high level block diagram of the mobile device according to one embodiment.

FIG. 2—Exemplary System Diagram of the Mobile Device

FIG. 2 is an exemplary system diagram of the mobile device 100. As shown, the mobile device 100 may include the port 108, e.g., for charging a battery 290 of the mobile device 100. Thus, the charging device 150 may be coupled to the mobile device 100 via the port 108. As indicated above, the port 108 may be a USB port. In some embodiments, detection circuitry 220 may be coupled between the port 108 and the battery 290.

The detection circuitry 220 (e.g., analog detection circuitry) may be configured according to embodiments described herein. For example, the detection circuitry 220 may be configured to determine if the mobile device 100 is coupled to a faulty charging device (such as the charging device 150). In one embodiment, the detection circuitry 220 may be configured to detect an overvoltage condition of the power provided to the port 108. For example, the detection circuitry 220 may determine if the voltage of the power provided to the port 108 is greater than 5.5 volts, thereby determining that the mobile device 100 is coupled to a faulty charging device.

In some embodiments, the detection circuitry 220 may be configured to determine other conditions as well. For example, the detection circuitry 220 may be configured to detect overcurrent conditions (e.g., where the battery 290 is drawing or receiving too much current from the charging device 150 coupled to the mobile device 100). Such conditions could indicate that the battery 290 is faulty and/or that the mobile device 100 is coupled to a faulty charging device. Additionally, the detection circuitry may be able to detect a "charging profile" of the battery, which could be used to determine if a non-standard battery (e.g., a gray market battery) or a battery with a different type of chemistry was being used in the mobile device. For example, the detection circuitry 220 may be able to determine if a NiCad battery is being used in place of a Li-Ion battery or Alkaline cell or cells.

In some embodiments, the detection circuitry 220 may include a high voltage tolerant device (or other circuitry) capable of dissipating additional power provided by the faulty charging device. For example, the detection circuitry 220 may include a high voltage tolerant linear regulator, e.g., in line with the Vbus or charging device power source, possibly with voltage dropping resistor(s) which may be able to dissipate excessive voltage supplied to the mobile device.

Upon determining a faulty condition (e.g., of the battery 290 or the charging device 150), the detection circuitry 220 may provide an indication of the faulty battery 290 and/or charging device 150 to a processor 250 (e.g., a baseband or applications processor) of the mobile device 100. For example, an interrupt may be generated by the detection circuitry 220 (e.g., in the power management IC or the physical layer Vbus circuits). As shown, the processor may be coupled to memory medium 260 which may store program instructions, e.g., which may be executable to perform various embodiments described herein. Thus, the mobile device 100 may include one or more processors and memory mediums for executing programs and/or Operating System(s). The programs stored in the memory medium may be executable to perform functionality of the mobile device 100. For example, the mobile device 100 may store a program for playing audio files on the portable device, making telephone calls, browsing the Internet, checking email, etc.

In response to receiving the indication of the faulty battery 290 and/or charging device 150, the processor 250 may execute program instructions stored on the memory medium 260 to perform a variety of possible actions. For example, in one embodiment, an indication may be provided to the user of the mobile device 100 that the mobile device 100 is coupled to a faulty charging device. Alternatively, or additionally, an indication may be provided to the user that the mobile device 100 includes a faulty battery (e.g., which may start a fire if action is not taken). In various embodiments, the indication provided to the user may be an audio indication (e.g., a beep, a sound indicating an emergency, one or more speech phrases indicating the problem, etc.) or a visual indication (e.g., displayed on the display 102 of the mobile device 110). The visual indication may take the form of picture(s), video(s), image(s), text, etc.

Additionally, the processor may execute instructions for retrieving location information, e.g., to determine the location of the mobile charging device 100 (and, in the case of a faulty charging device, thereby also determining the location of the faulty charging device). For example, to determine location information, the processor may request the location information from the location circuitry 270. For example, the location circuitry 270 may be global positioning system (GPS) circuitry which may be configured to determine latitude, longitude, elevation, etc. based on GPS data. Alternatively, in embodiments where the mobile device 100 is a satellite phone, the location information may determine location using the communication satellites.

Alternatively, or additionally, the location circuitry 270 may be configured to determine location information based on the location of one or more wide area network towers (e.g., cell phone towers) which are detectable from the location of the mobile device 100. For example, the location circuitry 270 may be able to triangulate the position of the mobile device 100 from the wide area network towers.

In further embodiments, the location circuitry 270 may be configured to determine location information based on available local wireless networks (e.g., WiFi hotpots). For example, using information of the available local wireless network(s) (e.g., a MAC address of a router or hub of the WiFi hotspot, the name of the WiFi hotspot, an IP address provided by the WiFi hotspot, etc.), the location circuitry 270 may be configured to determine the location. In one embodiment, the location circuitry 270 may be configured to use a database (possibly stored or accessed via the Internet) of wireless networks and location information for those wireless networks to determine the current location of the mobile device 100. After determining location information (i.e., information that specifies or is usable to determine the location of the mobile device 100), the location circuitry 270 may provide the location information to the processor 250.

Note that while embodiments described above are directed towards actions of the location circuitry 270, alternate configurations and embodiments are envisioned, e.g., where communication circuitry 280 and/or instructions stored on the memory medium 260 and executed by the processor 250 assist in (or actually perform) determining the location of the mobile device 100. For example, the communication circuitry 280 (also referred to as a "network port") may be involved in triangulation of the wide area network towers and/or accessing information regarding local wireless networks. Note that the communication circuitry 280 may perform communication for the mobile device 100. For example, the communication circuitry 280 may be able to communicate with other networks or systems using various protocols, e.g., WLAN (802.11x), WiMAX, Bluetooth, CDMA, TDMA, FDMA, UMTS, WCDMA, and/or other communication protocols.

Similarly, the processor 250 may assist in performing the calculation or determination of the location. For example, the processor 250 may perform calculations for triangulating the position from the wide area network towers. In further embodiments, one or more of the location circuitry 270 and the communication circuitry 280 may be embodied in part or wholly by the memory medium 260 and processor 250.

Note that while an exemplary specific configuration of the mobile device 100 is described above (and depicted in FIG. 2) various other configurations are envisioned. For example, various portions of the mobile device 100 shown in FIG. 2 may be omitted or combined. Additionally, various other circuitry may be added to the mobile device 100, e.g., additional processors and memories, audio circuitry, video processors, etc., as desired. In some embodiments, the one or more of the blocks of FIG. 2 may be included or combined in a single chip (e.g., in a system on a chip (SOC)). For example, the processor 250, memory 260, communication circuitry 280, and location circuitry 270 may be on a single chip. In various embodiments, the detection circuitry 220 may be included in such a chip or may be separate from the chip, as desired.

Figure 3:
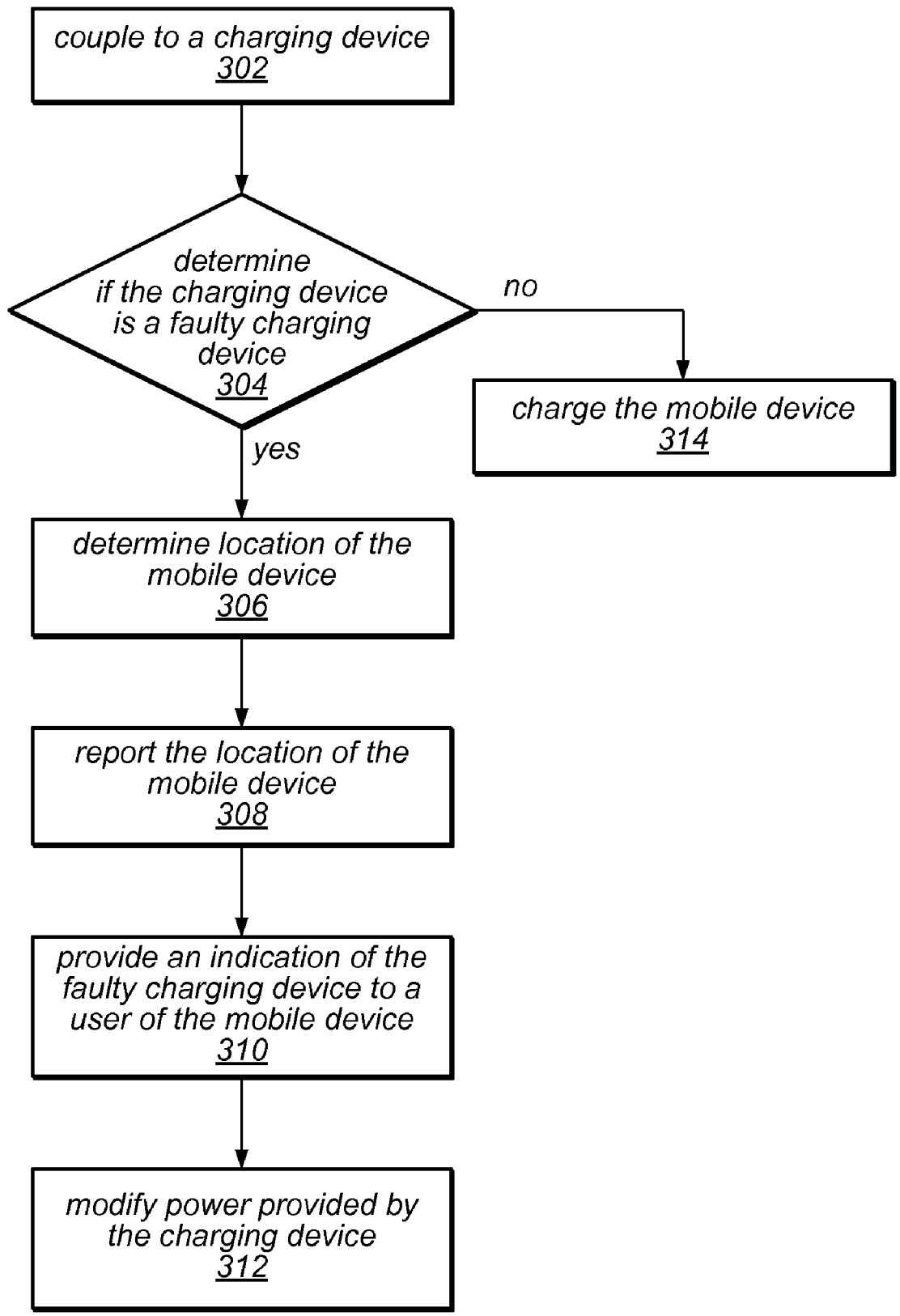
FIG. 3 is a flowchart diagram illustrating one embodiment of a method for reporting a faulty charging device.

FIG. 3—Reporting a Faulty Charging Device

FIG. 3 illustrates a method for reporting the location of a faulty charging device. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a mobile device (e.g., the mobile device 100) may be coupled to a charging device (e.g., the charging device 150). In some embodiments, the mobile device may be coupled to the charging device via a USB connection. As indicated above, the mobile device may be any of a variety of mobile devices (e.g., cell phones, smart phones, PDAs, laptops, etc.). Similarly, the charging device may be any device which is configured to couple to a power source (e.g., a wall outlet) and provide power from that power source to the mobile device. The charging device may modify the power, e.g., limiting the power from the power source to the mobile device, converting the power (e.g., from AC to DC), conditioning the power, and/or other types of modifications. Thus, in some embodiments, the charging device may be a wall charger. However, it should be noted that the charging device may be a computer system, e.g., where the mobile device is coupled to the computer system for charging/synching (e.g., via a USB connection).

In 304, it may be determined if the charging device is a faulty charging device (e.g., a non-compliant USB-IF charger). For example, detection circuitry of the mobile device may determine if the charging device is providing faulty power. In one embodiment, the mobile device (e.g., the detection circuitry) may determine that the charging device is providing an over voltage (e.g., providing power with a voltage level over, for example, 5.5 volts, which may be specified by the USB specification). Thus, if the mobile device determines that the voltage of the power provided is over a certain threshold, it may be determined that the charging device is a faulty charging device. Similarly, the mobile device may determine that the power being provided is over a certain threshold of current (i.e., that an over current is being provided). This may indicate that the charging device is faulty, or possibly that the battery of the mobile device is faulty (e.g., that the battery is drawing too much power from the charging device). For example, a battery drawing too much power may result in a fire of the mobile device (due to the faulty battery).

In 306, if the device is a faulty charging device, the location of the mobile device may be determined. In determining the location of the mobile device, the location of the faulty charging device may also be determined (since the faulty charging device is coupled to the mobile device). In one embodiment, various circuitry of the mobile device may be used to determine GPS location information (e.g., using GPS circuitry). Additionally, or alternatively, the location information may be determined using one or more wide area network towers (e.g., cell phone towers) which are detectable by the mobile device. For example, the mobile device may be able to triangulate its position based on the available signals from nearby wide area network towers.

In another embodiment, the mobile device may be able to determine location information based on an IP address assigned to the mobile device and/or an IP address of a router coupled to the mobile device. For example, the location of the router may be known, and the general location of the mobile device may be therefore determined based on the location of the router. Similarly, the location of the mobile device may be determined based on available local wireless networks (e.g., WiFi hotspots). In one embodiment, the location of the WiFi hotspots may be known (e.g., stored in a database on the mobile device or on a wide area network, such as the Internet), possibly based on MAC addresses of the routers of the WiFi hotspots. By detecting one or more of the available local wireless networks, the mobile device may be able to triangulate its position based on the positions of those networks. One or more of the methods for determining the location information above may be combined to provide more accurate location information.

The location information may include longitude, latitude, elevation, change in location, and/or data for determining such information. For example, the location information may include the GPS data for determining the longitude, latitude, elevation, change in location, etc. This information could be processed locally (e.g., by a processor of the mobile device) or remotely (e.g., by a server system) to determine the location of the mobile device (and thereby the location of the charging device).

In some embodiments, additional information may be determined based on the location information. For example, the rate of change of location may be determined, and that information may indicate a context for the charging. For example, where the location is changing at a high rate (e.g., 30 miles an hour or more), it may indicate that the mobile device and charging device is inside a car, and that the faulty charging device is a car charging device. Thus, besides the specific latitude and longitude information, it may be determined the context of the charging (e.g., that the faulty charger is in the user's car, or a charger used on a train or ship, among other possibilities). Similarly, if the charging device's location is the same as the location of the user's home, it may be determined that the faulty charging device is in the user's home. Thus, additional information may be determined based on the location information. The additional information may also include timing information for when the faulty charging device began charging the mobile device in an improper manner, the duration of the charge, etc. Furthermore, the additional information may indicate the type of problem (e.g., the faulty charging device, a faulty battery, etc.). This additional information may be separate from or included in the location information, as desired.

In 308, the location of the mobile device may be reported. For example, the mobile device may report the location of the mobile device (and therefore also the location of the faulty charging device) to a network administrator and/or service provider. For example, the location of the mobile device (which may include or be provided with the additional information described above) may be reported to the service provider which provides communication services for the mobile device. Additionally, or alternatively, the location of the faulty charging device may be provided to a network administrator or IT helpdesk support of a company which owns the mobile device or a company associated with the user of the mobile device.

Accordingly, the administrator or service provider may be in a position to remove the faulty charging device and/or tell the user to remove the faulty charging device. This may be particularly useful in situations where the faulty charging device disables or destroys the mobile device and a new replacement mobile device is required. Thus, the network administrator and/or service provider may require that the faulty charging device be located and removed before providing the replacement mobile device (which could otherwise lead to the destruction of the new replacement mobile device).

In 310, an indication of the faulty charging device may be provided to a user of the mobile device. For example, an indication of the faulty charging device may be provided to the user via a display of the mobile device. For example, a message indicating that the user has connected the device to a faulty charging device may be displayed on the display. Other embodiments are envisioned (e.g., videos, pictures, etc.). Additionally, or alternatively, an audio indication may be provided to the user indicating that the mobile device is in danger or is coupled to the faulty charging device. The audio indication could be a beep, an emergency sound, a phone ring, a text message alert (e.g., if a text message is displayed on the screen, for example), one or more speech phrases indicating the problem, etc. The indication of the problem may also include steps to take to address the problem (e.g., power off the phone, unplug the charging device, remove the battery, step away from the mobile device, etc.). Similarly, where the battery is faulty, audio and/or visual indications may be provided indicating the problem and/or possible solutions related to the battery (or other problems of the mobile device).

In 312, the power provided by the charging device may be modified or stopped. For example, the detection circuitry (which may be analog) may be able to dissipate the overvoltage or overcurrent provided by the charging device. More specifically, in one embodiment, the detection circuitry may include a high voltage tolerant device which may be able to dissipate any voltage over 5.5 volts. In one embodiment, the detection circuitry may include a high current linear regulator in line with the Vbus or charging device voltage source, possibly with high current dropping resistor(s) which may dissipate excessive power supplied to the mobile device. Additionally, or alternatively, the detection circuitry may include circuitry able to stop the provision of power from the charging device to avoid damage to the mobile device.

In 314, if the charging device is not a faulty charging device, the mobile device may be charged according to normal charging procedures.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for reporting a faulty charging device, comprising:
   a mobile device determining if a charging device is a faulty charging device, wherein said determining is performed after coupling the charging device to a power source and to the mobile device; and
   if the charging device is a faulty charging device, the mobile device reporting a location of the faulty charging device over a network.

2. The method of claim 1, wherein said determining if the charging device is a faulty charging device comprises determining if the charging device is providing an over voltage.

3. The method of claim 2, wherein the overvoltage is greater than 5.5 volts.

4. The method of claim 2, further comprising:
   dissipating the overvoltage.

5. The method of claim 4, wherein said dissipating the overvoltage is performed by a high voltage tolerant device.

6. The method of claim 1, wherein said reporting the location of the faulty charging device comprises;
   determining global positioning system (GPS) location information; and
   the mobile device reporting the GPS location information over the network.

7. The method of claim 1, wherein said reporting the location of the faulty charging device comprises:
   determining location information using one or more wide area network towers; and
   the mobile device reporting the location information over the network.

8. The method of claim 1, wherein said reporting the location of the faulty charging device comprises:
   determining location information based on available local wireless networks; and
   reporting the location information over the network.

9. The method of claim 1, further comprising:
   providing an audible indication of the faulty charging device to a user of the mobile device.

10. The method of claim 1, further comprising:
    providing a visible indication of the faulty charging device to a user of the mobile device.

11. A mobile device for reporting a faulty charging device, comprising:
    a processor;
    a network port coupled to the processor;
    a charging device port for coupling to a charging device;
    a battery coupled to the charging device port for receiving power from the charging device;
    first circuitry coupled to the charging device port, wherein the first circuitry is configured to determine if the charging device is a faulty charging device, wherein the first circuitry is configured to operate after the charging device port is coupled the charging device;
    second circuitry coupled to the processor for determining a location of the mobile device; and
    a memory which stores program instructions executable by the processor to report the location of the faulty charging device over a network using the second circuitry and the network port.

12. The mobile device of claim 11, wherein the first circuitry is configured to determine if the charging device is providing an overvoltage to determine if the charging device is a faulty charging device.

13. The mobile device of claim 12, wherein the overvoltage is greater than 5.5 volts.

14. The mobile device of claim 12, wherein the first circuitry comprises:
    high voltage tolerant circuitry, wherein the high voltage tolerant circuitry is coupled to the charging device port and the battery, and wherein the high voltage tolerant circuitry is configured to dissipate the overvoltage.

15. The mobile device of claim 11, wherein the second circuitry comprises global positioning system (GPS) circuitry for determining the location of the mobile device.

16. The mobile device of claim 11, wherein the second circuitry is configured to use one or more wide area network towers to determine the location of the mobile device.

17. The mobile device of claim 11, wherein the second circuitry is configured to determine the location of the mobile device based on available local wireless networks.

18. The mobile device of claim 11, wherein the mobile device further comprises a display coupled to the processor, and wherein the program instructions are further executable by the processor to:
    provide an indication of the faulty charging device on the display of the mobile device.

19. The mobile device of claim 11, wherein the mobile device further comprises an audio output coupled to the processor, and wherein the program instructions are further executable by the processor to:
    provide an indication of the faulty charging device via the audio output of the mobile device.

20. A memory medium comprising program instructions, wherein the program instructions are executable to:
receive an indication of a faulty charging device coupled to a mobile device;
determine a location of the mobile device;
report the location of the faulty charging device over a network, wherein the location of the faulty charging device comprises the location of the mobile device; and
provide information on a display of the mobile device indicating that the device is coupled to the faulty charging device.

21. A system, comprising:
one or more processors; and
one or more memory mediums coupled to the one or more processors, wherein the one or more memory mediums store program instructions executable by the one or more processors to:
receive an indication that a faulty charging device is coupled to a mobile device from the mobile device over a network;
receive a location of the faulty charging device;
provide the location of the faulty charging device to an administrator of the faulty charging device.

22. A method for reporting a faulty charging device, comprising:
a mobile device determining that a charging device is a faulty charging device, wherein said determining is performed after coupling the charging device to a power source and to the mobile device;
storing information regarding the faulty charging device, wherein the information comprises a location of the faulty charging device; and
providing the information regarding the faulty charging device.

23. The method of claim 22, wherein information further comprises a time when the mobile device was coupled to the faulty charging device.

* * * * *